US007015171B2

(12) United States Patent
Domen et al.

(10) Patent No.: US 7,015,171 B2
(45) Date of Patent: Mar. 21, 2006

(54) PHOTOCATALYST COMPRISING TITANIUM FLUORIDE NITRIDE FOR WATER DECOMPOSITION WITH VISIBLE LIGHT IRRADIATION

(75) Inventors: Kazunari Domen, Sagamihara (JP); Michikazu Hara, Yokohama (JP); Tsuyoshi Takata, Sagamihara (JP); Kota Nukimizu, Yokohama (JP)

(73) Assignee: Japan Science & Technology Agency, Saitama (JP)

( * ) Notice: Subject to any disclaimer, the term of this patent is extended or adjusted under 35 U.S.C. 154(b) by 14 days.

(21) Appl. No.: 10/500,283

(22) PCT Filed: Aug. 7, 2002

(86) PCT No.: PCT/JP02/08071

§ 371 (c)(1), (2), (4) Date: Aug. 14, 2004

(87) PCT Pub. No.: WO03/068393

PCT Pub. Date: Aug. 21, 2003

(65) Prior Publication Data

US 2005/0020440 A1 Jan. 27, 2005

(30) Foreign Application Priority Data

Feb. 14, 2002 (JP) ............................. 2002-036587

(51) Int. Cl.
*B01J 27/24* (2006.01)
*B01J 27/138* (2006.01)
*B01J 27/135* (2006.01)
*B01J 27/13* (2006.01)
*B01J 23/00* (2006.01)

(52) U.S. Cl. ..................... 502/200; 502/226; 502/227; 502/350; 502/230

(58) Field of Classification Search ................ 502/200, 502/226, 227, 350

See application file for complete search history.

(56) References Cited

U.S. PATENT DOCUMENTS

| 6,074,981 | A | * | 6/2000 | Tada et al. | .................. 502/224 |
| 6,194,346 | B1 | * | 2/2001 | Tada et al. | .................. 502/224 |
| 6,589,906 | B1 | * | 7/2003 | Sato et al. | .................. 502/300 |
| 6,864,211 | B1 | * | 3/2005 | Domen et al. | .............. 502/200 |

FOREIGN PATENT DOCUMENTS

| JP | 09-070533 | * | 3/1997 |
| JP | 10-165820 | * | 6/1998 |
| JP | 11-315398 | * | 11/1999 |

* cited by examiner

*Primary Examiner*—J. A. Lorengo
*Assistant Examiner*—Patricia L. Hailey
(74) *Attorney, Agent, or Firm*—Sherman & Associates

(57) ABSTRACT

A photo-catalyst containing titanium fluoride nitride comprising, $Ti(IV)O_aN_bF_c$ or a compound represented by $MeTi(IV)O_aN_bF_c$ prepared by doping at least one metal Me selected from the group consisting of alkali or alkaline earth metals on $Ti(IV)O_aN_bF_c$. (wherein, b is 0.1 to 1, c is 0.1 to 1 and a is a value to maintain Ti(IV) and is decided in relation to b and c.). The photo-catalyst containing titanium fluoride nitride is especially characterized by loading at least one promoter selected from the group consisting of Pt, Ni and Pd.

10 Claims, 14 Drawing Sheets

Fig.20; Comparative Example 1
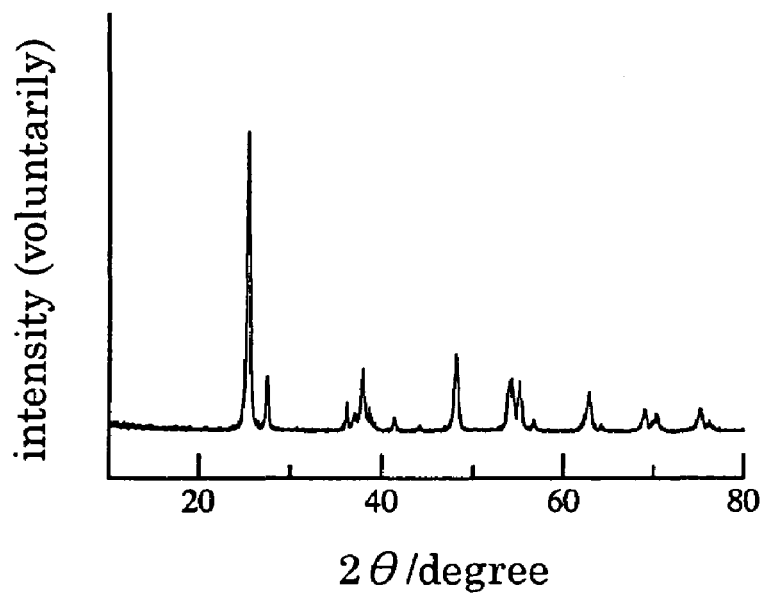
Fig.21; Comparative Example 1
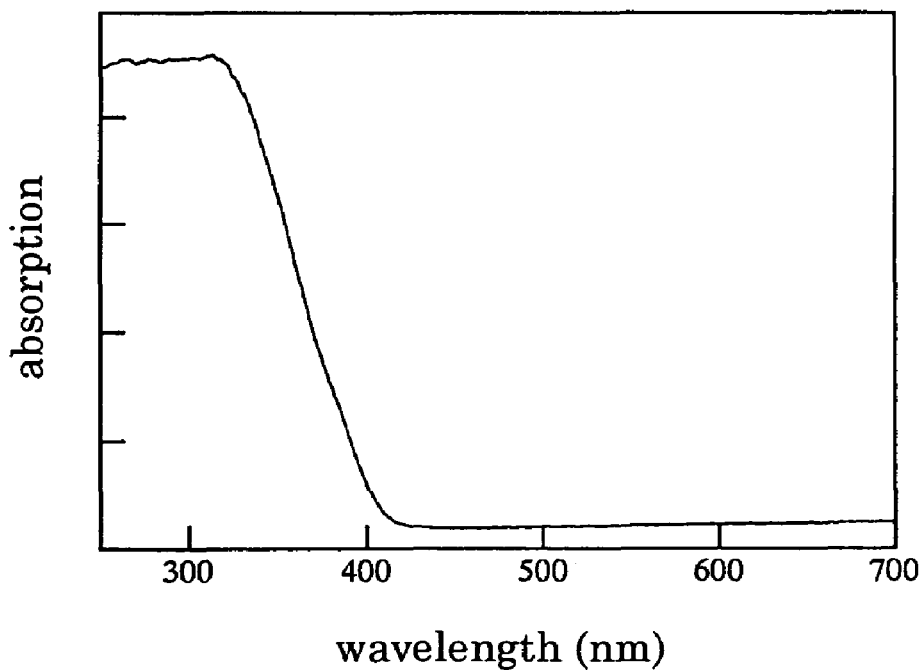

Fig.22; Comparative Example 2
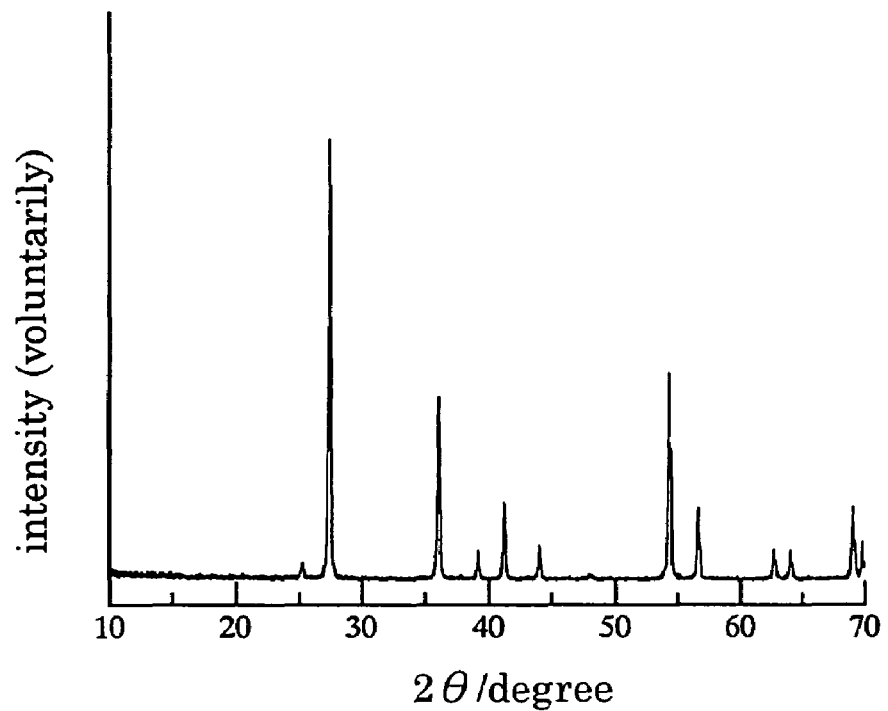
Fig.23; Comparative Example 2
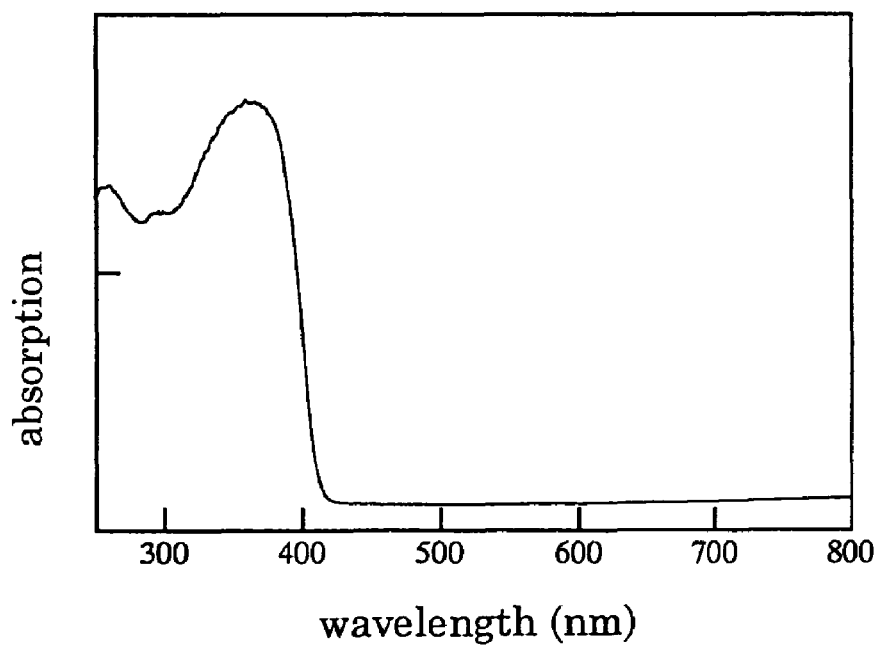

Fig.24; Comparative Example 3
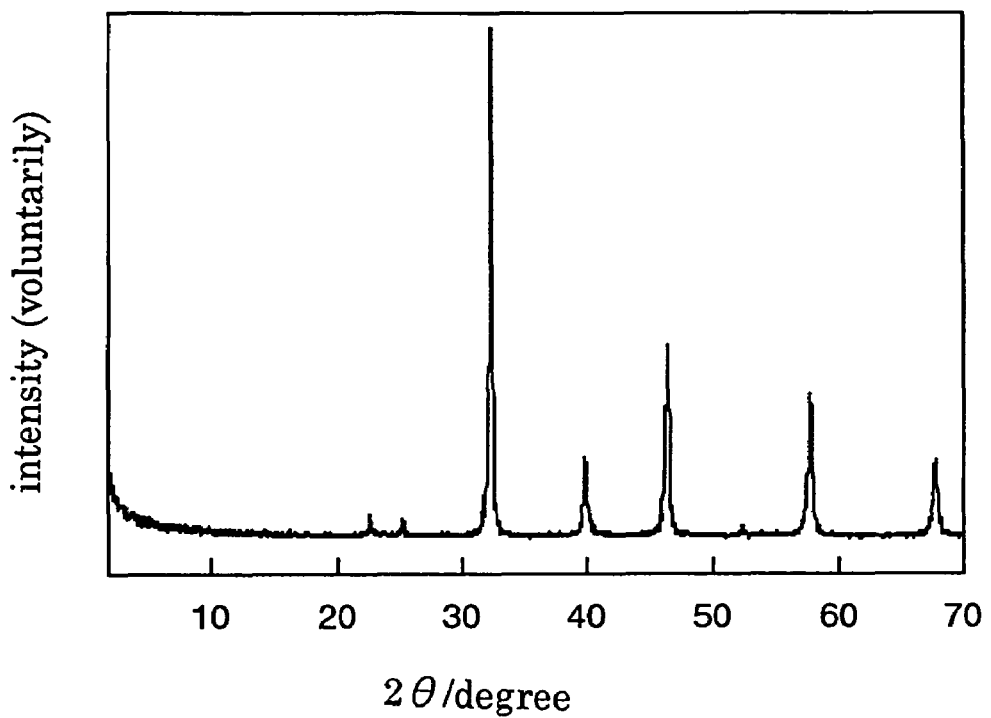
Fig.25; Comparative Example 3
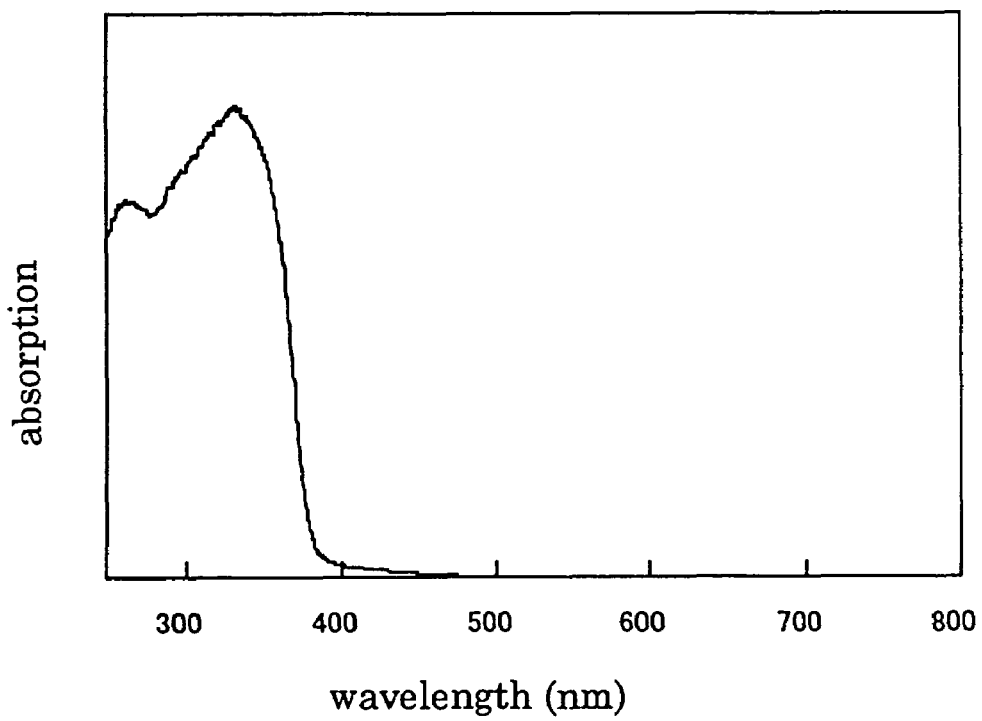

Fig.26; Comparative Example 4
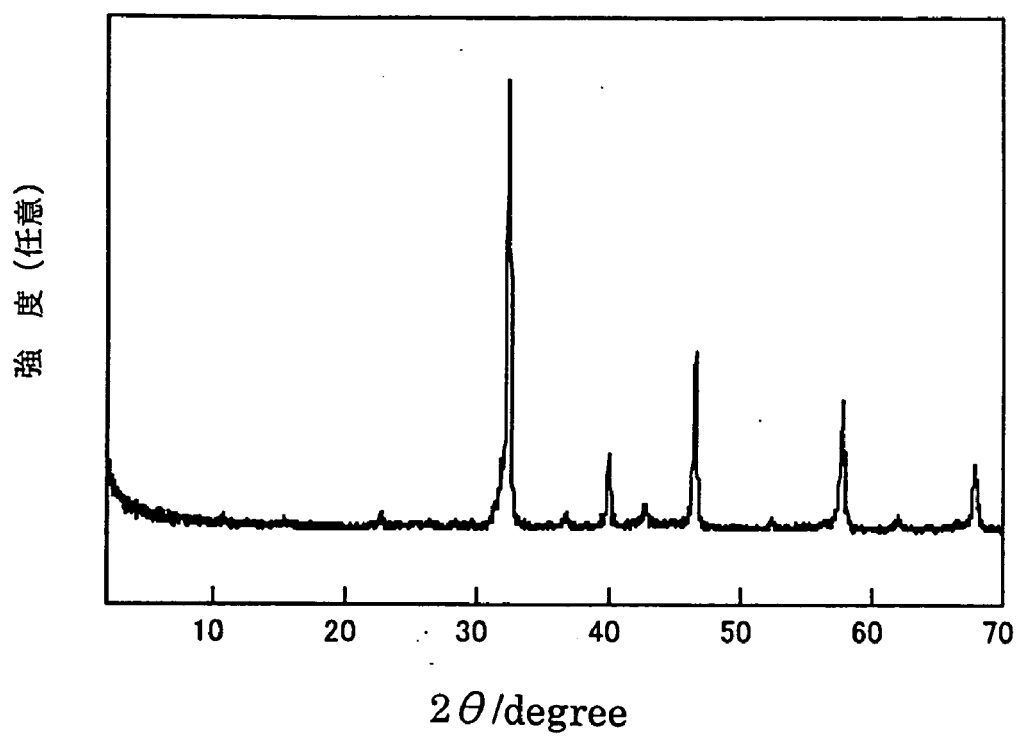
Fig.27; Comparative Example 4
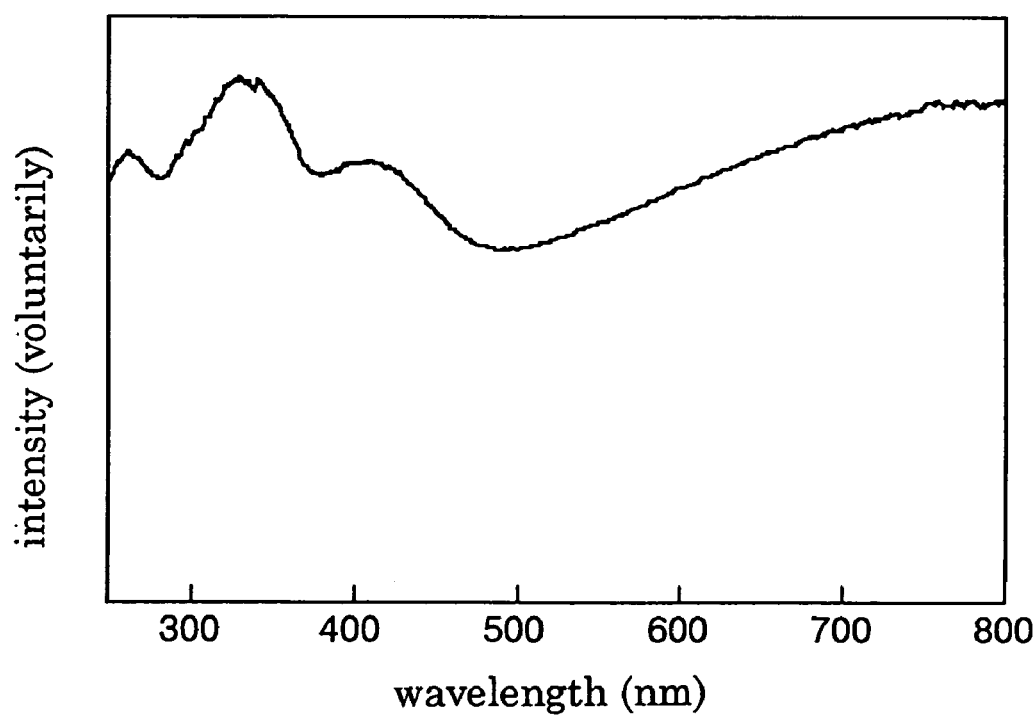

PHOTOCATALYST COMPRISING TITANIUM FLUORIDE NITRIDE FOR WATER DECOMPOSITION WITH VISIBLE LIGHT IRRADIATION

FIELD OF THE INVENTION

The present invention relates to a photo-catalyst containing titanium fluoride nitride, in particular related to a photo-catalyst which is stable to photo splitting reaction of water having a possibility to reduce a proton to hydrogen or to oxidize water to oxygen by visible light.

DESCRIPTION OF THE PRIOR ART

As a technique to carry out catalyst reaction by light, a method to obtain an aimed product by irradiating light to a solid compound which has catalytic function and oxidizing or reducing the reaction product by generated exiting electron or hole is already known.

Especially, the photo splitting of water is widely interested from the view point of photo energy conversion. Further, the photo catalyst which displays activity to photo splitting reaction of water can be considered to be an excellent photo functional material possessing functions such as photo absorption, electrolytic separation or oxidation-reduction reaction at the surface.

Kudo and Kato et al are illustrating that alkali tantalite or alkali earth is a photo catalyst which displays high activity to the complete photo splitting reaction of water exemplifying many prior arts [for example, Catal. Letter., 58(1999). 153–155, Chem. Letter., (1999), 1207, Surface, Vol. 36, No.12 (1998), 625–645 (shortened to Document A)].

In above mentioned Document A, a useful photo-catalyst material to progress the splitting reaction of water to hydrogen and/or oxygen is illustrated, and many indications regarding hydrogen generating reaction by reduction of water or oxygen generating reaction by oxidization of water and a photo-catalyst for complete photo splitting reaction of water are mentioned. Further, said Document A refers to a photo-catalyst which loads a promoter such as platinum or NiO.

However, a photo-catalyst illustrated in Document A is mainly the photo-catalyst which contains oxide as a non-metallic element. Further, since the width of the forbidden band of many solid photo-catalyst existing between valence band conduction band, namely, band gap energy is large ($\geq 3$ eV), it is hard to act by visible light of lower energy (energy: less than 3 eV). In the meanwhile, almost all of conventional solid photo-catalyst whose gap energy is small and can generate electron and hole by visible light have a problem of photo corrosion under the reacting condition of photo splitting reaction of water. For example, in the cases of CdS or Cu—ZnS, although the band gap is 2.4 eV, since these are affected by oxidative photo corrosive action, the catalytic reaction is limited. While, almost all of the sun light which reaches to the surface of earth is visible light whose energy is small, and for the purpose to progress the various catalyst reaction, it is necessary to develop a photo-catalyst which is stable under the condition of photo catalytic reaction. However, unfortunately, there was no photo-catalyst to satisfy above mentioned requirement up to the present time.

As mentioned above, since almost all of sun light which can be utilized at the surface of earth is visible light, it was necessary to develop a photo-catalyst which is stable under various reaction conditions of oxidation and reduction. Almost all of the conventional stable photo-catalyst are the metal oxide, that is, containing oxide as a non metallic element. In the cases of these compounds, since the positional relationship between conduction band and valence band from energy view point is largely controlled by energy of valence electron (02 p) orbit of oxygen, band gap energy is large and can not generate photo-catalytic function by visible light. Since it was anticipated that the energy level of valence band is elevated when an element whose valence electron energy is higher than that of oxygen is reacted with metal and hybridize their valence electron orbits, the inventors of the present invention considered if stable compound can be found out among these compounds under the photo-catalytic reaction condition, a novel photo-catalyst which acts by visible light will be able to be generated.

Since the valence electron of nitrogen atom has higher energy than that of oxygen atom, the band gap energy of metal compound containing nitrogen atom can be made smaller than that of metal oxide and a metal and metal compound which is bonded by adequate amount of nitrogen atoms becomes possible to generate an excitation electron and a hole by absorption of visible light of longer wave, and can be a photo-catalyst which acts by visible light. And the inventors of the present invention have continued intensive study to find out a compound which is stable under the reaction condition among these photo-catalysts, and found out that the compound composing of oxynitride containing at lease one transition element can fulfill the function of the photo-catalyst which satisfies the above mentioned condition, and already proposed as the invention which dissolved said problem (JP Application 2000-256681; filed on Aug. 28, 2000). Most of these compounds have perovskite-type crystalline structure, and the stabilizing effect under said photo-catalyst reaction condition is conjectured to be caused by this structural feature.

As a visible light active compound which was found out based on above mentioned conjecture, although a stable compound can be obtained among the compounds containing Ta or Nb, however, it was difficult to obtain a stable compound among the compound containing Ti(IV). Therefore, the inventors of the present invention have investigated the method how to obtain a useful compound as the visible light active photo-catalyst based on the theory of above mentioned hybridized oxynitride bonding orbital. In above mentioned consideration, the confirmation of characteristics based on above mentioned theory is considered to be useful.

The subject of the present invention is to provide a compound which is stable as a visible light active photo-catalyst having nitride bond of Ti(IV), further the object of the present invention is to provide a method for preparation of said compound. During the various considerations how to introduce a nitride bond into the compound containing Ti(IV), which has photo-catalytic activity, the inventors of the present invention found out that the introduction of nitride bond of Ti(IV) is possible when Ti(IV) contains F bond, and found out the synthesis of the compound containing Ti(IV) which has nitride bond by using compounds of $TiO_aN_bF_c$ or $MeTiO_aN_bF_c$. And found that the obtained compound has a possibility to be a catalyst which is active by visible light, especially to be a catalyst which generates hydrogen or oxygen by photo splitting of water, thus the subject of the present can be accomplished. In the compounds of $TiO_aN_bF_c$ or $MeTiO_aN_bF_c$, Me is an alkali earth metal such as Sr, c is 0.1 to 1, b is 0.1 to 1, desirably $b \geq 0.3$, and a is a value to be decided in relation to b and c.

By the way, when titanium oxide is nitrided with ammonia by the conventional method, $Ti^{3+}$ is generated by reducing reaction, and when nitride reaction is moderated in order to suppress the reducing reaction, it becomes difficult to introduce sufficient nitrogen into material and the synthesis of the compound containing Ti(IV) which has nitride bond is impossible, and the responsibility to visible light of the material is too low to absorb the visible light of around 600 nm. Accordingly, the method for synthesis of the compound containing Ti(IV) which has nitride bond is an epoch-making invention.

SUMMARY OF THE INVENTION

The first one of the present invention is a photo-catalyst containing titanium fluoride nitride comprising, $Ti(IV)O_aN_bF_c$ or a compound represented by $MeTi(IV)O_aN_bF_c$ prepared by doping at least one metal Me selected from the group consisting of alkali or alkaline earth metals on $Ti(IV)O_aN_bF_c$ (wherein. b is 0.1 to 1, c is 0.1 to 1 and a is a value to maintain Ti(IV) and is decided in relation to b and c.). Desirably, the present invention is the photo-catalyst containing titanium fluoride nitride, wherein $Ti(IV)O_aN_bF_c$ possesses anataze structure and $MeTi(IV)O_aN_bF_c$ possesses perovskite to anatase structure. Further desirably the present invention is the photo-catalyst containing titanium fluoride nitride to which at least one promoter selected from the group consisting of Pt, Ni and Pd is loaded.

The second one of the present invention is a photo-catalyst for water splitting containing titanium fluoride nitride comprising $Ti(IV)O_aN_bF_c$ or a compound represented by $MeTi(IV)O_aN_bF_c$ prepared by doping at least one metal Me selected from the group consisting of alkali or alkaline earth metals on $Ti(IV)O_aN_bF_c$. (wherein. b is 0.1 to 1, c is 0.1 to 1 and a is a value to maintain Ti(IV) and is decided in relation with b and c.). Desirably, the second one of the present invention is a photo-catalyst for water splitting containing titanium fluoride nitride wherein $Ti(IV)O_aN_bF_c$ possesses anatase structure and $MeTi(IV)O_aN_bF_c$ possesses perovskite to anatase structure. Further desirably the second one of the present invention is a photo-catalyst for water splitting containing titanium fluoride nitride to which at least one promoter selected from the group consisting of Pt, Ni and Pd is loaded.

The third one of the present invention is a method for preparation of a photo-catalyst represented by $Ti(IV)O_aN_bF_c$ (wherein a, b and c are same as to first one of the present invention) by baking titanium di-ammonium fluoride halide containing at least F represented by $(NH_4)_2TiF_dX_{6-d}$ (wherein, d is 1–6) and ammonium halide by the ratio of equimolar or by the ratio of slightly excess of ammonium halide at the maximum temperature from 200° C. to 500° C., desirably from 300° C. to 450° C. so as to form a starting material, then said starting material is nitrogenated by thermal synthesis in ammonia atmosphere containing from 0.02% to 10.00% of oxygen, air or water to ammonia by reduced mass to oxygen atom at the maximum temperature from 350° C. to 700° C., desirably from 400° C. to 600° C. over than 5 hours.

The fourth one of the present invention is a method for preparation of a photo-catalyst represented by $SrTi(IV)O_aN_bF_c$ wherein a, b and c are same as to the first one of the present invention by baking titanium di-ammonium fluoride halide containing at least F represented by $TiF_xX_{6-x}$ and/or $(NH_4)_2TiF_dX_{6-d}$ (wherein x and d are 1–6) and at least one selected from the group consisting of SrO, SrOH and SrX so as to form a starting material or $SrTiF_6$, then said starting material or $SrTiF_6$ is nitrogenated by thermal synthesis in ammonia atmosphere containing from 0.02% to 10.00% of oxygen, air or water to ammonia by reduced mass to oxygen atom at the maximum temperature from 350° C. to 700° C. over than 5 hours.

BRIEF DESCRIPTION OF THE DRAWINGS

FIG. 20 is the X ray diffraction spectrum of the compound of titanium dioxide P25 on the market after baked of Comparative Example 1.

FIG. 21 shows the UV•Visible ray absorption characteristic curve of FIG. 20.

FIG. 22 is the X ray diffraction spectrum of the nitride compound prepared by baking titanium dioxide of Comparative Example 2 in the atmosphere of ammonia $NH_3$ at the maximum temperature 6000° C. for 15 hours.

FIG. 23 is the X ray diffraction spectrum of the nitride compound of FIG. 22.

FIG. 24 shows the X ray diffraction spectrum of strontium titanate $SrTiO_3$ on the market.

FIG. 25 shows the UV•Visible ray absorption characteristic curve of FIG. 24.

FIG. 26 is the X ray diffraction spectrum of the compound prepared by temperature programmed strontium titanate $SrTiO_3$ on the market of Comparative Example 4 to 4000° C.(673K) in the atmosphere of ammonia $NH_3$ by temperature-programming speed of 10K/minute then maintain this temperature for 5 hours.

FIG. 27 shows the UV•Visible ray absorption characteristic curve of FIG. 26.

DESCRIPTION OF THE PREFERRED EMBOYMENT

The present invention will be illustrated more in detail.

A. The photo-catalysts of the present invention can be obtained by satisfying the essential factors described in the claims.

As the compound having chemical composition of $(NH_4)_2TiF_dX_{6-d}$, (wherein d is 1–6) $(NH_4)_2TiF_6$ and $(NH_4)_2TiF_2XCl_4$ can be mentioned as the desirable one.

As the material to obtain a starting material to prepare the compound having chemical composition of $SrTi(IV)O_aN_bF_c$, the mixture of $TiF_4$ and $SrF_2$ can be mentioned as the desirable one.

EXAMPLE

The present invention will be illustrated more specifically according to the Examples, however, not intending to limit the scope of the present invention.

Example 1

As the first step, diammonium hexafluorotitanate $((NH_4)_2TiF_6)$ and ammonium chloride $(NH_4Cl)$ were mixed by 1:1 molar ratio. Then the mixture was contained into a golden tube and the opening was sealed by welding. This golden tube was baked at 400° C.(673K) in an electric furnace for 12 hours. After baking, synthesis by nitration was carried out under ammonium stream containing oxygen (ammonia flow rate: 0.2 dm³·min⁻¹, oxygen flow rate: 1 cm³·min⁻¹) at the temperature of 600° C.(873K) for 12 hours.

Loading of platinum on said material was carried out as follows. Namely, 0.00357 dm³ of 0.1 mol·0.1 moldm⁻³ tetraamminedichloro platinum $Pt(NH_4)_4Cl_2$ solution (Pt 3 wt %) was impregnated to 0.3 g of said material on a water bath and water was evaporated, then reduced by hydrogen at 300° C.(573K) for 2 hours.

Figure 1:
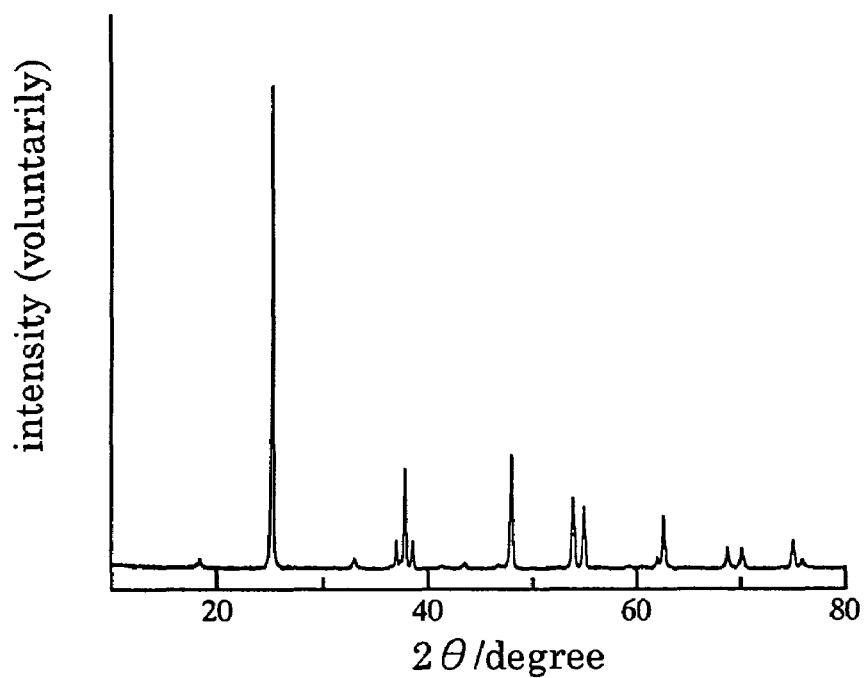
FIG. 1 is the X ray diffraction spectrum of the compound of Example 1 containing titanium fluoride nitride after nitration.
Figure 2:
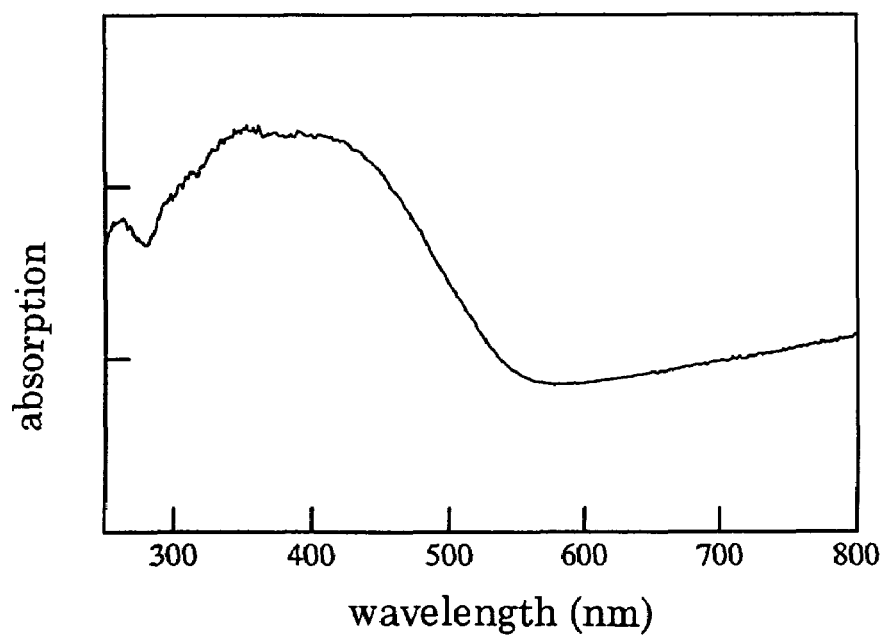
FIG. 2 is the UV•Visible ray absorption characteristic curve of the compound of Example 1 containing titanium fluoride nitride after nitration (obtained by diffuse reflectance spectrum. And so forth in followed Figures).

The X ray diffraction spectrum of the material after baking are shown in FIG. 1. All diffraction peaks in FIG. 1 are belonging to TiNF (refer to Paper: Angew. Chem. Int. Ed. Engle.27 (1988) No.7, p929–930) and the generation of TiNF is confirmed. UV•Visible ray absorption characteristic curve of said material (obtained by diffuse reflectance spectrum) is shown in FIG. 2. From FIG. 2, it becomes clear that said material absorbs visible light shorter than 600 nm. From the result of elemental analysis, the ratio of Ti:O:N:F is 1:1.76:0.13:0.10 ($TiO_{1.76}N_{0.13}F_{0.10}$).

Figure 3:
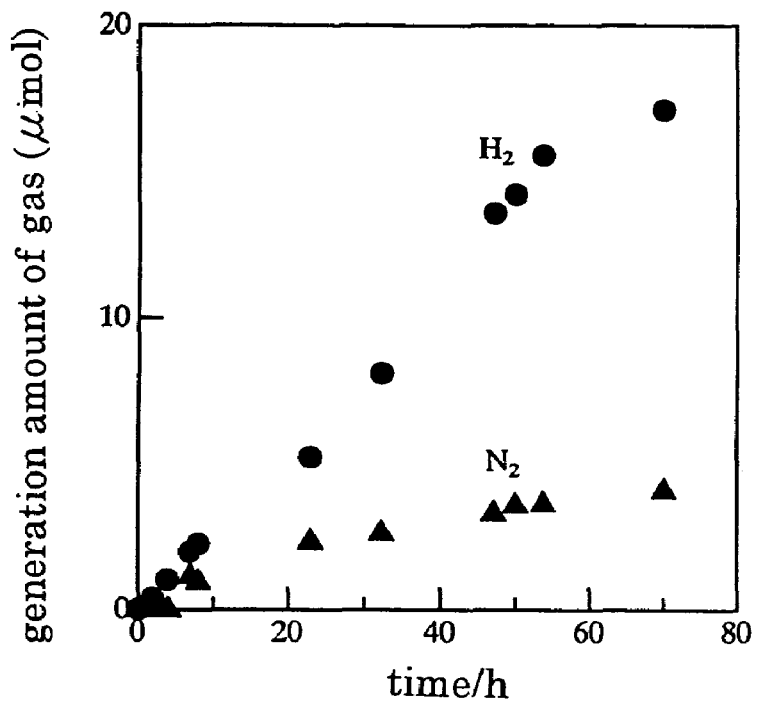
FIG. 3 shows the change of $H_2$ generation by time lapse from 10 vol % methanol aqueous solution by visible light longer than 420 nm using photo-catalyst prepared by loading 3% of platinum on the compound of Example 1 containing titanium fluoride nitride after nitration.
Figure 4:
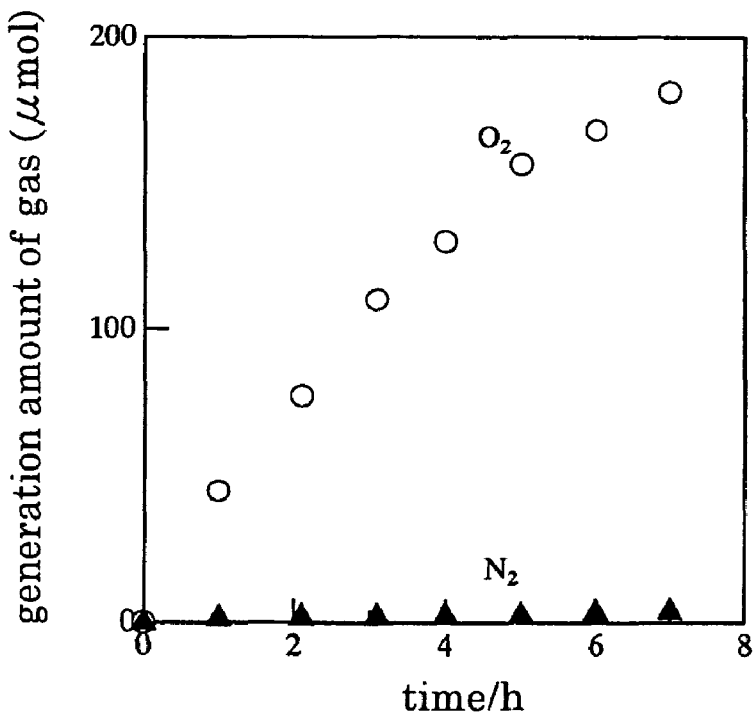
FIG. 4 shows the change of $O_2$ generation by time lapse from $AgNO_3$ aqueous solution by visible light longer than 420 nm using the photo-catalyst of FIG. 3.

In FIG. 3 the change of $H_2$ generation amount by time lapse when 0.2 g of material to which 3% of platinum is loaded is dispersed in 0.310 dm³ of 10 vol. % methanol aqueous solution and visible light longer than 420 nm is irradiated. 300 w xenon lamp is used as the light source and the visible light shorter than 420 nm is cut off by a cut off filter. As shown in FIG. 3, it is understood that said material can generate hydrogen constantly from methanol aqueous solution by the irradiation of visible light longer than 420 nm. Further, in FIG. 4 the change of oxygen generation amount by time lapse, when 0.2 g of above material is suspended into 0.310 dm³ of 0.01 moldm⁻³ $AgNO_3$ aqueous solution and visible ray longer than 420 nm is irradiated. The reaction is carried out by same condition mentioned above. From FIG. 4, it becomes clear that above mentioned material can generate oxygen from silver nitrate aqueous solution under irradiation of visible light longer than 420 nm.

As mentioned above, it is confirmed that TiNF has an ability to reduce proton to hydrogen and to oxidize water to oxygen by visible light which has longer wave length than 420 nm.

Example 2

As the first step, diammonium hexafluorotitanate $((NH_4)_2TiF_6)$ and ammonium chloride $(NH_4Cl)$ were mixed by 1:1 molar ratio. Then the mixture was contained into a glass tube, vacuumed and the opening was sealed by welding. This glass tube was baked at the temperature of 400° C. (673K) in an electric furnace for 12 hours. After baking, synthesis by nitration was carried out under ammonia stream containing oxygen (ammonia flow rate: 0.04 dm³·min⁻¹, oxygen flow rate: 0.2 cm³·min⁻¹) at the temperature of 500° C.(773K) for 10 hours. Loading of platinum on said material was carried out as follows. Namely, 0.00357 dm³ of 0.1 moldm⁻³ tetraamminedichloro platinum $Pt(NH_4)_4Cl_2$ solution (Pt 3 wt %) was impregnated to 0.3 g of said material on a water bath and water was evaporated, then reduced by hydrogen at 300° C.(573K) for 2 hours.

Figure 5:
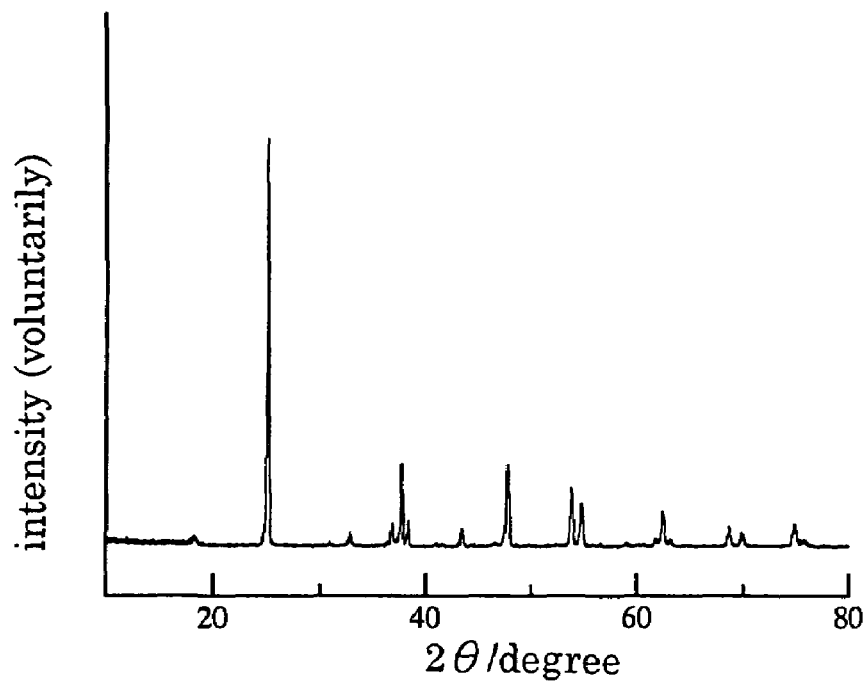
FIG. 5 is the X ray diffraction spectrum of the compound of Example 2 containing titanium fluoride nitride after nitration.
Figure 6:
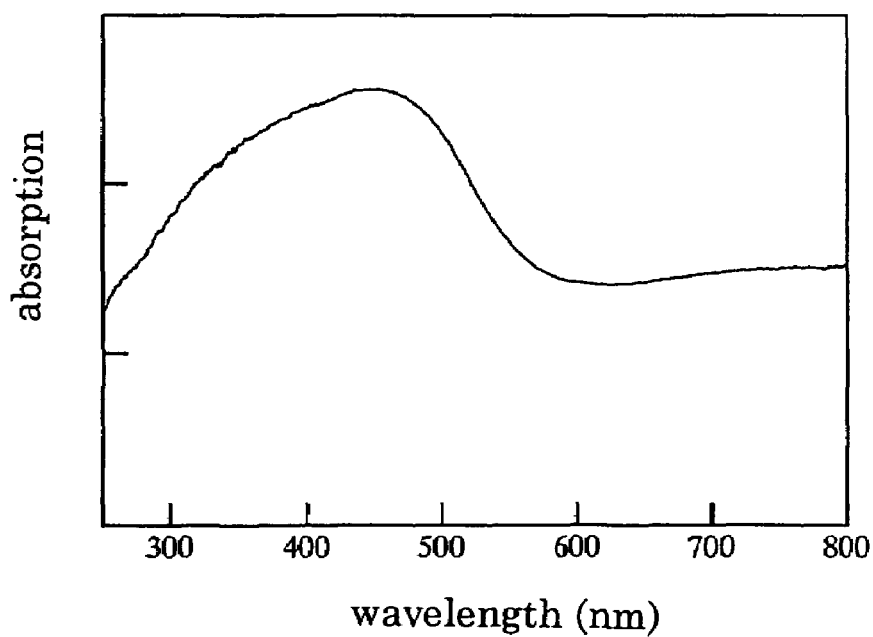
FIG. 6 is the UV•Visible ray absorption characteristic curve of the compound of Example 2 containing titanium fluoride nitride after nitration

The X ray diffraction spectrum of the material after baking are shown in FIG. 5. All diffraction peaks in FIG. 5 are belonging to TiNF (referred to afore mentioned Paper) and the generation of TiNF is confirmed. UV•Visible ray absorption characteristic curve of said material is shown in FIG. 6. From FIG. 6, it becomes clear that said material absorbs visible light shorter than 600 nm. From the result of elemental analysis, the ratio of Ti:O:N:F is 1:1.64:0.14:0.30.

Figure 7:
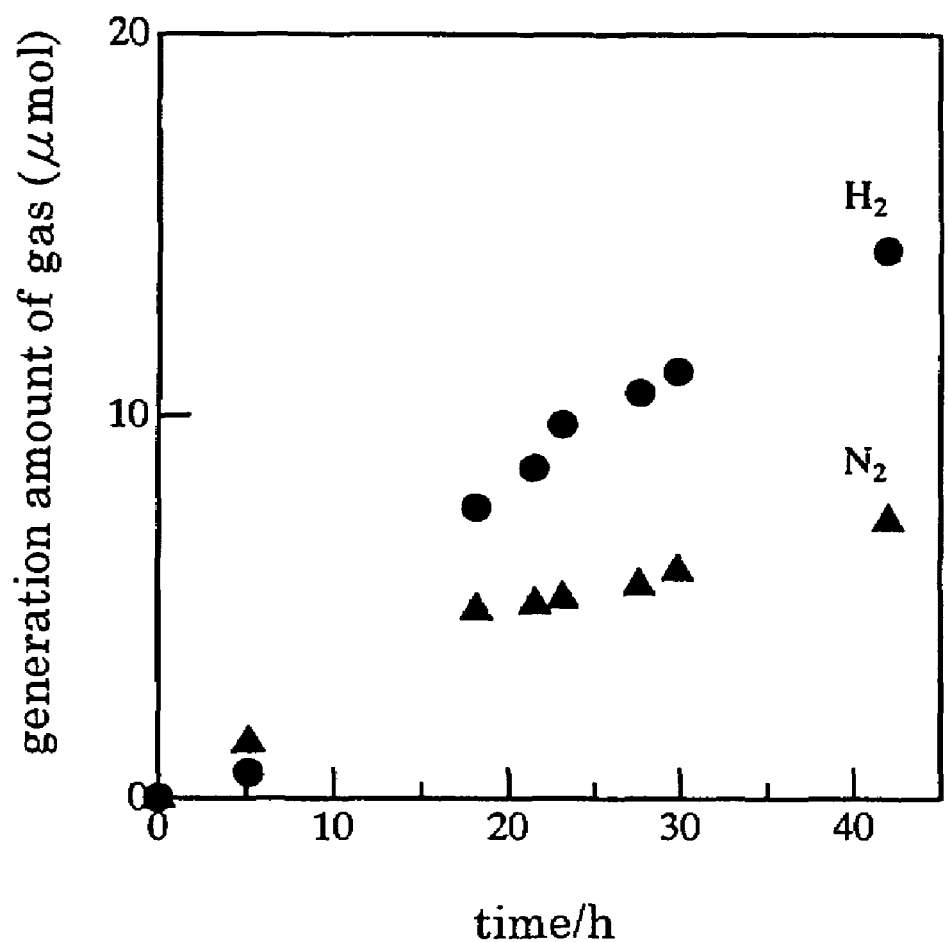
FIG. 7 shows the change of $H_2$ generation by time lapse from 10 vol % methanol aqueous solution by visible light longer than 420 nm using photo-catalyst prepared by loading 3% of platinum on the compound of Example 2 containing titanium fluoride nitride after nitration.
Figure 8:
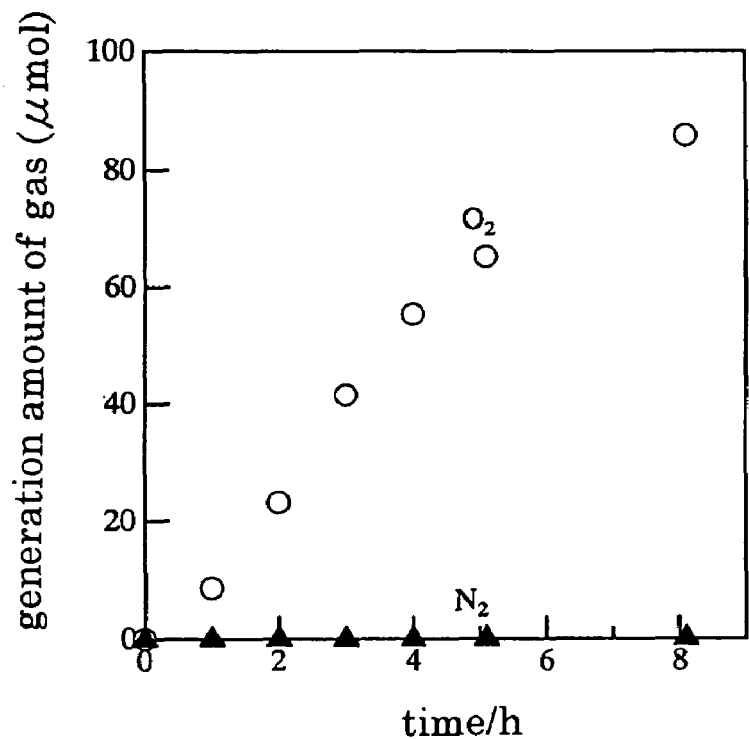
FIG. 8 shows the change of $O_2$ generation by time lapse from $AgNO_3$ aqueous solution by visible light longer than 420 nm using the photo-catalyst of FIG. 7.

In FIG. 7 the change of $H_2$ generation amount by time lapse when 0.2 g of material to which 3 wt % of platinum is loaded is dispersed in 0.310 dm³ of 10 vol. % methanol aqueous solution and visible light longer than 420 nm is irradiated. 300 w xenon lamp is used as the light source and the visible light shorter than 420 nm is cut off by a cut off filter. As shown in FIG. 7, it is understood that said material can generate hydrogen constantly from methanol aqueous solution by the irradiation of visible light longer than 420 nm. Further, in FIG. 8 the change of oxygen generation amount by time lapse, when 0.2 g of above material is suspended into 0.310 dm$^3$ of 0.01 moldm$^{-3}$ AgNO$_3$ aqueous solution and visible ray longer than 420 nm is irradiated. The reaction is carried out by same condition mentioned above. From FIG. 8, it becomes clear that above mentioned material can generate oxygen from silver nitrate aqueous solution under irradiation of visible light longer than 420 nm.

As mentioned above, it is confirmed that TiNF has an ability to reduce proton to hydrogen and to oxidize water to oxygen by visible light which has longer wave length than 420 nm.

Example 3

As the first step, diammonium hexafluorotitanate ((NH$_4$)$_2$TiF$_6$) and ammonium chloride (NH$_4$Cl) were mixed by 1:1 molar ratio. Then the mixture was contained into a glass tube, vacuumed and the opening was sealed by welding. This glass tube was baked at 400° C.(673K) in an electric furnace for 12 hours. After that, further baked at 300° C.(573K) under inert gas stream for 10 hours, then synthesis by nitration was carried out under ammonium stream containing oxygen (ammonia flow rate: 0.2 dm$^3$·min$^{-1}$, oxygen flow rate: 1 cm$^3$·min$^{-1}$) at the temperature of 600° C.(873K) for 15 hours. Loading of platinum on said material was carried out as follows. Namely, 0.00357 dm$^3$ of 0.1 moldm$^{-3}$ tetraamminedichloro platinum Pt(NH$_4$)$_4$Cl$_2$ solution (Pt 3 wt %) was impregnated to 0.3 g of said material on a water bath and water was evaporated, then reduced by hydrogen at 300° C.(573K) for 2 hours.

Figure 9:
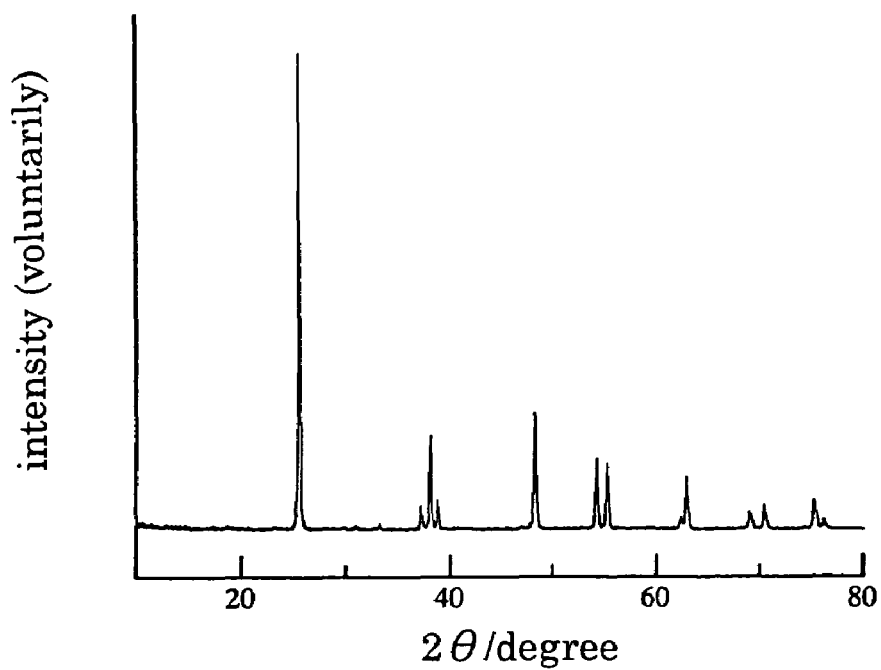
FIG. 9 is the X ray diffraction spectrum of the compound of Example 3 containing titanium fluoride nitride after nitration.
Figure 10:
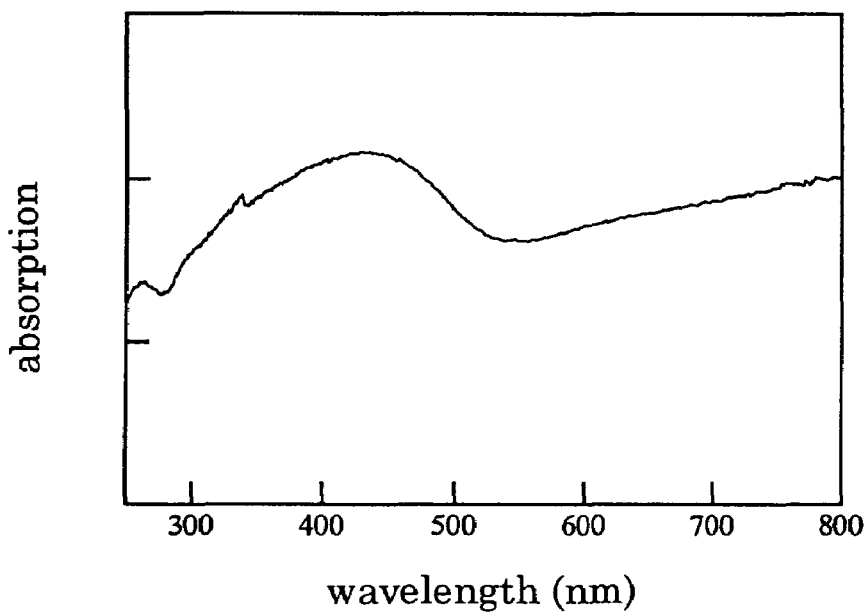
FIG. 10 is the UV•Visible ray absorption characteristic curve of the compound of Example 3 containing titanium fluoride nitride after nitration.

The X ray diffraction spectrum of the material after baking are shown in FIG. 9. All diffraction peaks in FIG. 9 are belonging to TiNF and the generation of TiNF is confirmed. UV•Visible ray absorption characteristic curve of said material is shown in FIG. 10. From FIG. 10, it becomes clear that said material absorbs visible light shorter than 600 nm. From the result of elemental analysis, the ratio of Ti:O:N:F is 1:1.74:0.13:0.14.

Figure 11:
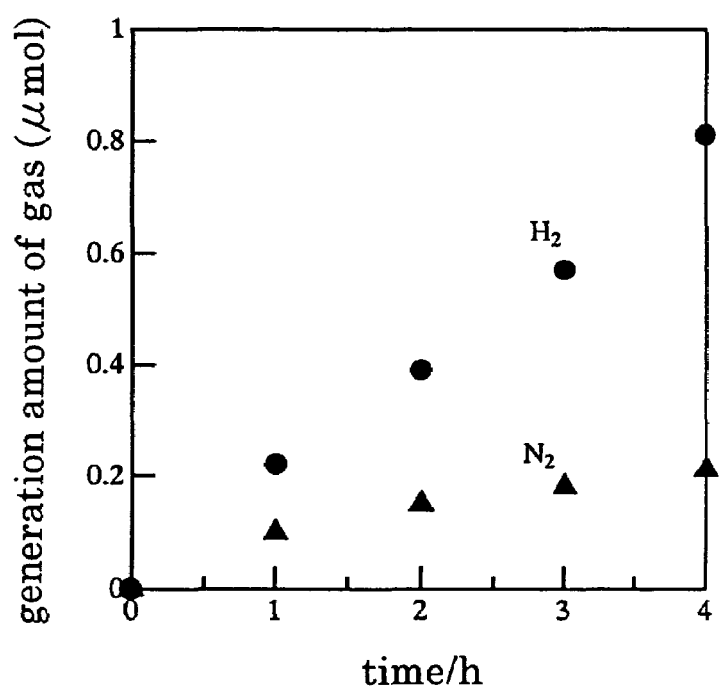
FIG. 11 shows the change of $H_2$ generation by time lapse from 10 vol % methanol aqueous solution by visible light longer than 420 nm using photo-catalyst prepared by loading 3% of platinum on the compound of Example 3 containing titanium fluoride nitride after nitration.
Figure 12:
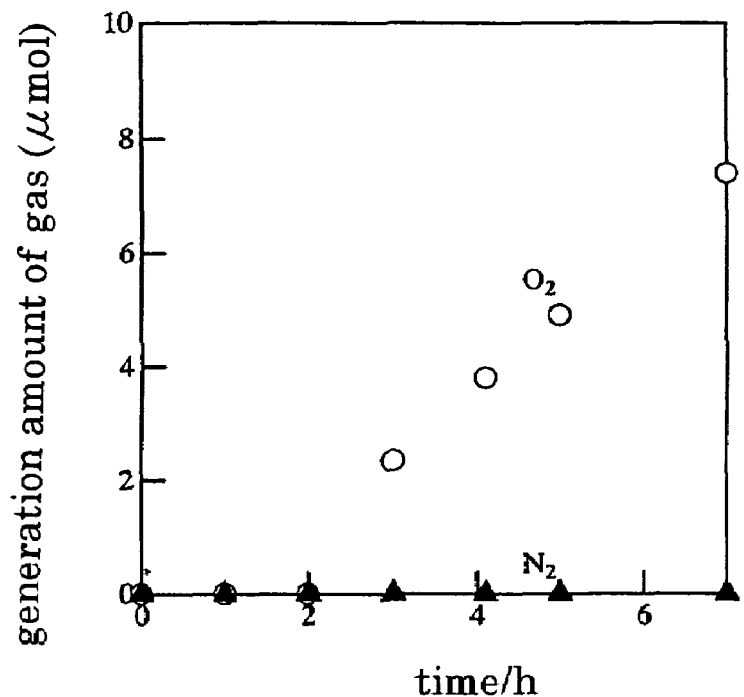
FIG. 12 shows the change of $O_2$ generation by time lapse from $AgNO_3$ aqueous solution by visible light longer than 420 nm using the photo-catalyst of FIG. 11.

In FIG. 11 the change of hydrogen generation amount by time lapse when 0.2 g of material to which 3 wt % of platinum is loaded is dispersed in 0.310 dm$^3$ of 10 vol. % methanol aqueous solution and visible light longer than 420 nm is irradiated. 300 w xenon lamp is used as the light source and the visible light shorter than 420 nm is cut off by a cut off filter. As shown in FIG. 11, it is understood that said material can generate hydrogen constantly from methanol aqueous solution by the irradiation of visible light longer than 420 nm. Further, in FIG. 12 the change of oxygen generation amount by time lapse, when 0.2 g of above material is suspended into 0.310 dm$^3$ of 0.01 moldm$^{-3}$ AgNO$_3$ aqueous solution and visible ray longer than 420 nm is irradiated. The reaction is carried out by same condition mentioned above. From FIG. 12, it becomes clear that above mentioned material can generate oxygen from silver nitrate aqueous solution under irradiation of visible light longer than 420 nm.

As mentioned above, it is confirmed that TiNF has an ability to reduce proton to hydrogen and to oxidize water to oxygen by visible light which has longer wave length than 420 nm.

Example 4

As the first step, diammonium hexafluorotitanate ((NH$_4$)$_2$TiF$_6$) and ammonium chloride (NH$_4$Cl) were mixed by 1:1 molar ratio. Then the mixture was contained into a golden tube, and the opening was sealed by welding. The sealed golden tube is inserted into a glass tube, said glass tube was vacuumed and sealed by welding. This glass tube was baked at 400° C.(673K) in an electric furnace for 12 hours. After that, further baked at 300° C. (573K) under inert gas stream for 10 hours, then synthesis by nitration was carried under ammonia stream (ammonia flow rate: 0.04 dm$^3$·min$^{-1}$, dry air flow rate: 0.2 cm$^3$·min$^{-1}$) at the temperature of 500° C. (773K) for 10 hours. Loading of platinum on said material was carried out as follows. Namely, 0.00357 dm$^3$ of 0.1 moldm$^{-3}$ tetraamminedichloro platinum Pt(NH$_4$)$_4$Cl$_2$ solution (Pt 3 wt %) was impregnated to 0.3 g of said material on a water bath and water was evaporated, then reduced by hydrogen at 300° C.(573K) for 2 hours.

Figure 13:
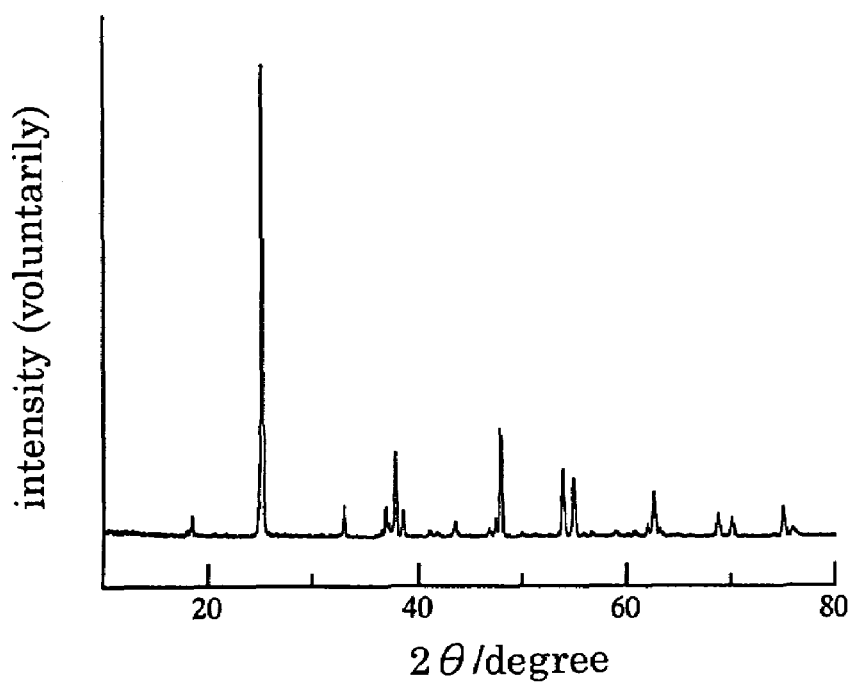
FIG. 13 is the X ray diffraction spectrum of the compound of Example 4 containing titanium fluoride nitride after nitration.
Figure 14:
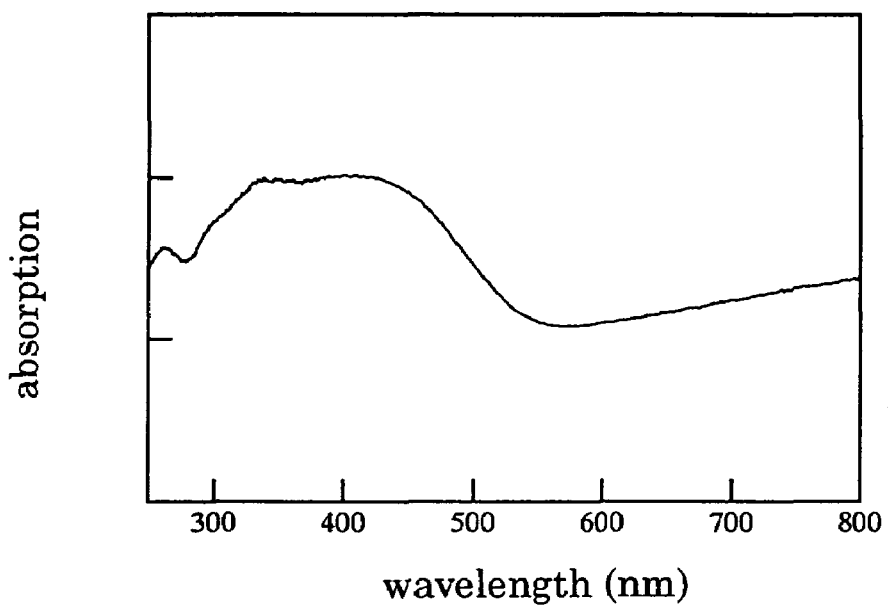
FIG. 14 is the UV•Visible ray absorption characteristic curve of the compound of Example 4 containing titanium fluoride nitride after nitration.

The X ray diffraction spectrum of the material after baking are shown in FIG. 13. All diffraction peaks in FIG. 13 are belonging to TiNF and the generation of TiNF is confirmed. UV•Visible ray absorption characteristic curve of said material is shown in FIG. 10. From FIG. 10, it becomes clear that said material absorbs visible light shorter than 600 nm. From the result of elemental analysis, the ratio of Ti:O:N:F is 1:1.45:0.30:0.20.

Figure 15:
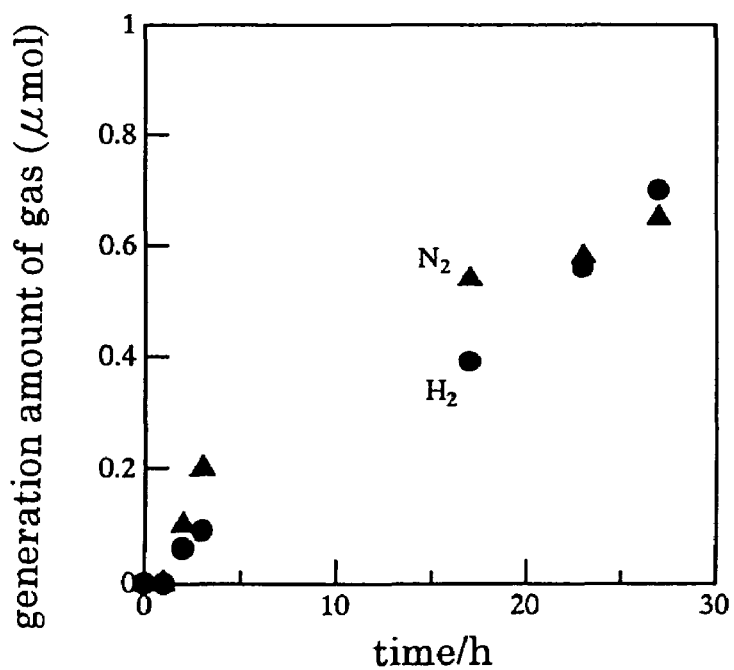
FIG. 15 shows the change of $H_2$ generation by time lapse from 10 vol % methanol aqueous solution by visible light longer than 420 nm using photo-catalyst prepared by loading 3% of platinum on the compound of Example 4 containing titanium fluoride nitride after nitration.
Figure 16:
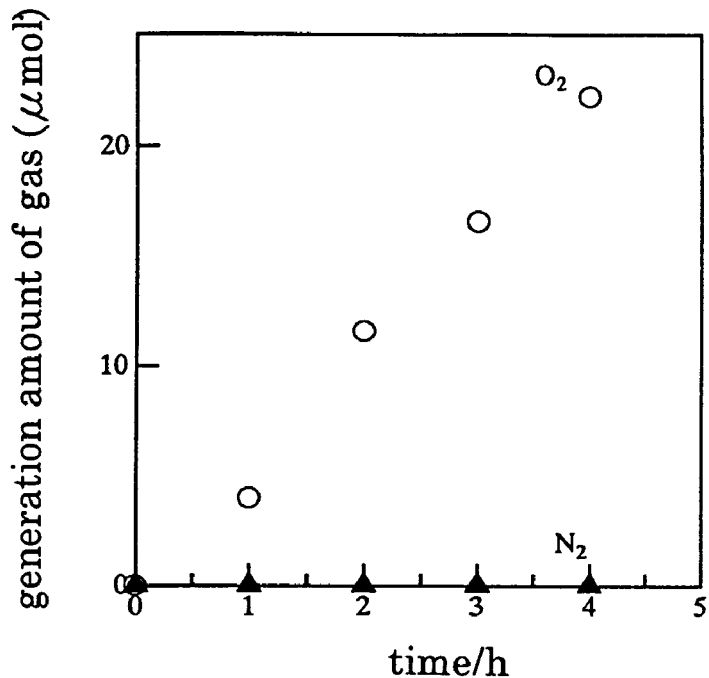
FIG. 16 shows the change of $O_2$ generation by time lapse from $AgNO_3$ aqueous solution by visible light longer than 420 nm using the photo-catalyst of FIG. 15.

In FIG. 15 the change of hydrogen generation amount by time lapse when 0.2 g of material to which 3 wt % of platinum is loaded is dispersed in 0.310 dm$^3$ of 10 vol. % methanol aqueous solution and visible light longer than 420 nm is irradiated. 300 w xenon lamp is used as the light source and the visible light shorter than 420 nm is cut off by a cut off filter. As shown in FIG. 15, it is understood that said material can generate hydrogen constantly from methanol aqueous solution by the irradiation of visible light longer than 420 nm. Further, in FIG. 16 the change of oxygen generation amount by time lapse, when 0.2 g of above material is suspended into 0.310 dm$^3$ of 0.01 moldm$^{-3}$ AgNO$_3$ aqueous solution and visible ray longer than 420 nm is irradiated. The reaction is carried out by same condition mentioned above. From FIG. 16, it becomes clear that above mentioned material can generate oxygen from silver nitrate aqueous solution under irradiation of visible light longer than 420 nm.

As mentioned above, it is confirmed that TiNF has an ability to reduce proton to hydrogen and to oxidize water to oxygen by visible light which has longer wave length than 420 nm.

Example 5

Titanium fluoride TiF$_4$ (0.9 g) and strontium fluoride SrF$_4$ (0.6 g) were mixed together in Ar atmosphere and sealed in a golden tube. This golden tube was further sealed in a Pyrex glass tube in vacuum condition and the temperature was elevated by temperature-programming speed of 10K/minute, then the temperature was maintained at 450° C. for 8 hours. After that cooled down to room temperature and SrTiF$_6$ was synthesized. The obtained SrTiF$_6$ was set under ammonia stream containing oxygen (ammonia flow rate: 0.4 dm$^3$·min$^{-1}$, oxygen flow rate: 0.4 cm$^3$·min$^{-1}$) and the temperature was elevated to 673K by temperature-programming speed of 10K/minute under ammonia stream of 40 dm$^3$/min flow rate and maintained for 5 hours by this temperature. After that the temperature was cooled down to room temperature and SrTiONF material was synthesized. According to the elemental analysis results, the ratio of Sr:Ti:O:N:F was 1:2.35:0.30:0.40. Pt, which is a promoter, was deposited on a catalyst by dispersing platinic chloride $HPtCl_6$ in following reaction solution then photo electrodepositing. Impregnated amount of the promoter can be adjust in the range from 0.1 to 10 weight %.

Figure 17:
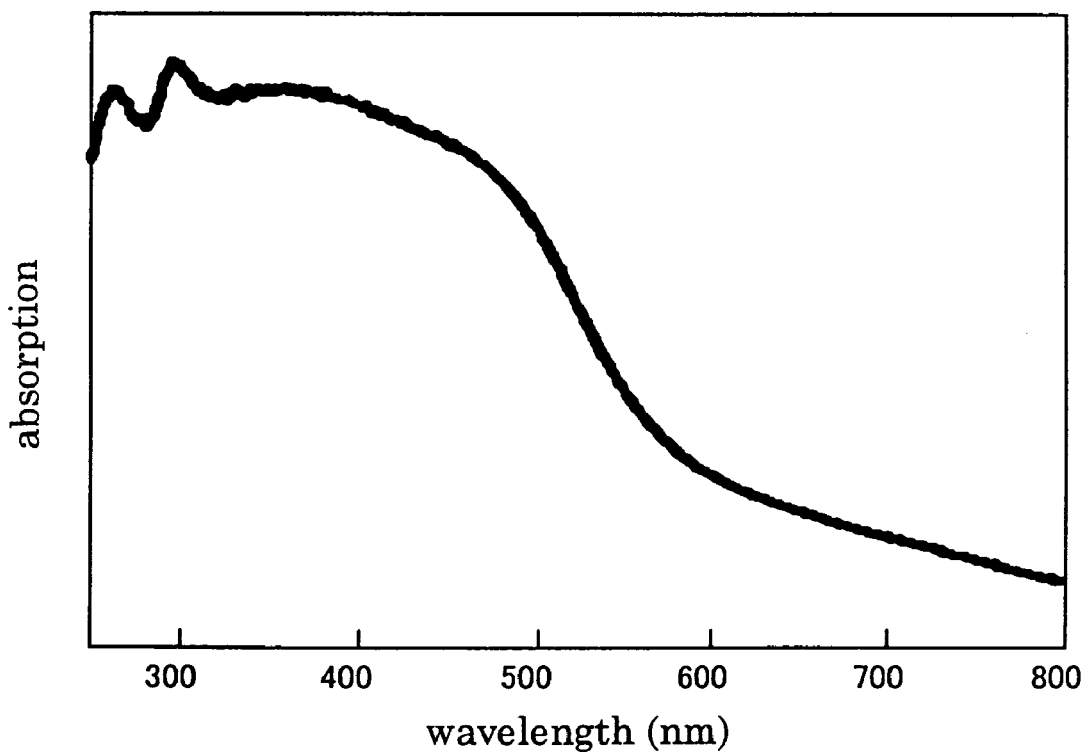
FIG. 17 shows the UV•Visible ray absorption characteristic curve of SrTiONF material of Example 5.
Figure 18:
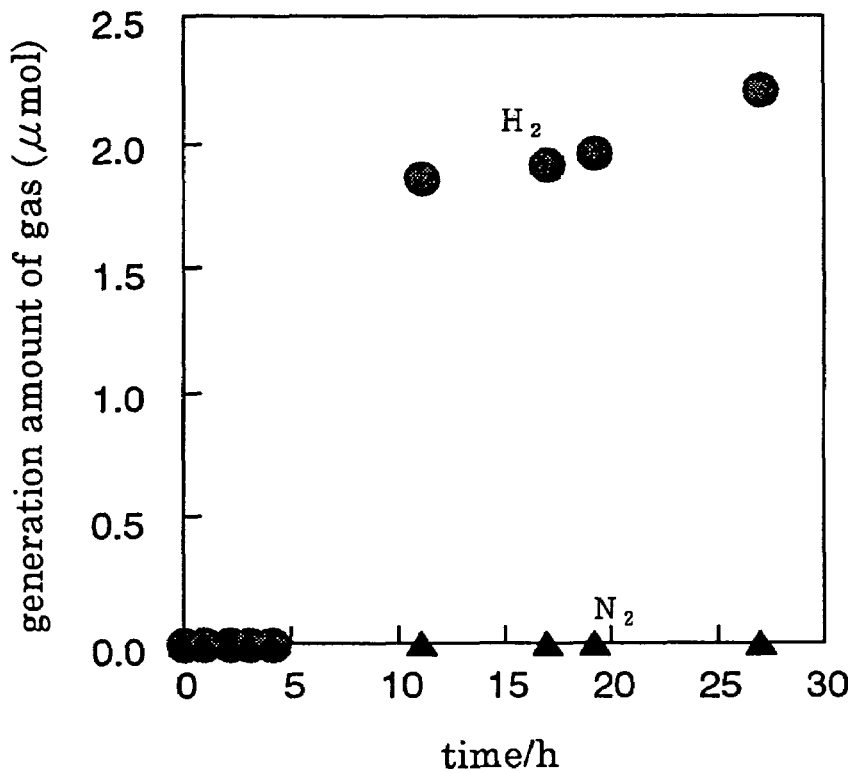
FIG. 18 shows the change of $H_2$ generation by time lapse from 10 vol % methanol aqueous solution by visible light longer than 420 nm using photo-catalyst prepared by loading 1 wt % of platinum on SrTiONF material of Example 5.
Figure 19:
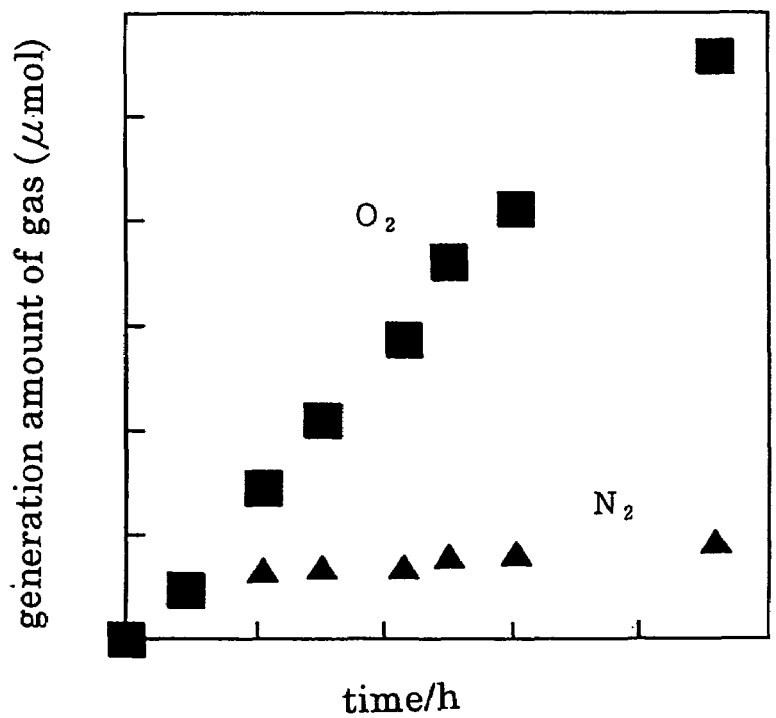
FIG. 19 shows the change of $O_2$ generation by time lapse from $AgNO_3$ aqueous solution by visible light longer than 420 nm using the photo-catalyst of FIG. 18.

UV•Visible ray absorption characteristic curve of said material is shown in FIG. 17. From FIG. 17, it becomes clear that said material absorbs visible light shorter than 600 nm. In FIG. 18 the change of hydrogen generation amount by time lapse when 0.2 g of material to which 1 wt % of platinum is loaded is dispersed in 0.200 $dm^3$ of 10 vol. % methanol aqueous solution and visible light longer than 420 nm is irradiated. 300 w xenon lamp is used as the light source and the visible light shorter than 420 nm is cut off by a cut off filter. As shown in FIG. 18, it is understood that said material can generate hydrogen constantly from methanol aqueous solution by the irradiation of visible light longer than 420 nm. Further, in FIG. 19 the change of oxygen generation amount by time lapse, when 0.2 g of above material is suspended into 0.200 $dm^3$ of 0.01 mol/dm $AgNO_3$ aqueous solution and visible ray longer than 420 nm is irradiated. The reaction is carried out by same condition mentioned above. From FIG. 19, it becomes clear that above mentioned material can generate oxygen from silver nitrate aqueous solution under irradiation of visible light longer than 420 nm. From above mentioned results, it is confirmed that SrTiONF has an ability to reduce proton to hydrogen and to oxidize water to oxygen by visible light which has longer wave length than 420 nm.

Comparative Example 1

Titanium dioxide P25, which is the product of Nihon Aerogil was used. Loading of platinum on said material was carried out as follows. Namely, 0.00357 $dm^3$ of 0.1 $moldm^{-3}$ tetraamminedichloro platinum $Pt(NH_4)_4Cl_2$ solution (Pt 3 wt %) was impregnated to 0.3 g of said material on a water bath and water was evaporated, then reduced by hydrogen at 300° C.(573K) for 2 hours.

The X ray diffraction spectrum of said material is shown in FIG. 20. In FIG. 20, diffraction peaks of anataze phase and rutile phase can be observed. UV•Visible ray absorption characteristic curve of said material is shown in FIG. 21. From FIG. 21, it becomes clear that said material absorbs only UV light shorter than 400 nm, and does not absorb visible light.

The hydrogen generating reaction and oxygen generating reaction were carried out by same condition to Example 1, however, both hydrogen and oxygen were not generated. From above mentioned results, it is confirmed that titanium dioxide P25 does not have an ability to reduce proton to hydrogen and to oxidize water to oxygen.

Comparative Example 2

Titanium dioxide was set under ammonia $NH_3$ stream of flow rate 1 $dm^3 \cdot min^{-1}$, and the temperature was elevated to 600° C. (873K) by temperature-programming speed of 10 $Kmin^{-1}$ and baked at this temperature for 15 hours, thus nitride was obtained. Loading of platinum on said material was carried out as follows. Namely, 0.00357 $dm^3$ of 0.1 $moldm^{-3}$ tetraamminedichloro platinum $Pt(NH_4)_4Cl_2$ solution (Pt 3 wt %) was impregnated to 0.3 g of said material on a water bath and water was evaporated, then reduced by hydrogen at 300° C.(573K) for 2 hours.

The X ray diffraction spectrum of said material after baking is shown in FIG. 22. In FIG. 22, anataze phase of titanium dioxide can be observed. UV•Visible ray absorption characteristic curve of said material is shown in FIG. 23. From FIG. 23, it become clear that said material absorbs only UV light shorter than 400 nm, and does not absorb visible light.

The hydrogen generating reaction and oxygen generating reaction were carried out by same condition to Example 1, however, both hydrogen and oxygen were not generated. From above mentioned results, it is confirmed that nitride of titanium dioxide does not have an ability to reduce proton to hydrogen and to oxidize water to oxygen.

Comparative Example 3

Strontium titanate $SrTiO_3$ on the market was used. Pt, which is a promoter, was deposited on a catalyst by dispersing platinic chloride $HPtCl_6$ in following reaction solution then photo electrodepositing. Impregnated amount of the promoter can be adjust in the range from 0.1 to 10 weight %.

The X ray diffraction spectrum of said material after baking is shown in FIG. 24. Diffraction peaks in FIG. 24 are confirmed to belong to $SrTiO_3$. UV•Visible ray absorption characteristic curve of said material is shown in FIG. 25. From FIG. 25, it become clear that said material absorbs UV light shorter than 370 nm. Same as to Example 1, reactions were carried out under visible ray irradiation, however, generations of $H_2$ and $O_2$ were not observed.

Comparative Example 4

Strontium titanate $SrTiO_3$ on the market was set under ammonia $NH_3$ stream of flow rate 40 dm/min, and the temperature was elevated to 400° C. (673K) by temperature-programming speed of 10K/min and maintained this temperature for 5 hours, then the temperature was cooled down to room temperature in Ar atmosphere and $SrTi(ON)_X$ material was synthesized. Pt, which is a promoter, was deposited on a catalyst by dispersing platinic chloride $HPtCl_6$ in following reaction solution then photo electrodepositing. Impregnated amount of the promoter can be adjusted in the range from 0.1 to 10 weight %.

The X ray diffraction spectrum of said material after baking is shown in FIG. 26. Diffraction peaks in FIG. 26 are confirmed to belong to $SrTiO_3$. UV•Visible ray absorption characteristic curve of said material is shown in FIG. 27. From FIG. 27, it becomes clear that said material absorbs visible light shorter than 600 nm. However, in longer wave length side, absorption which can be guessed to originate to $Ti^{3+}$ generated by reduction is observed. Same as to Example 1, reactions were carried out under visible ray irradiation, however, generations of $H_2$ and $O_2$ were not observed.

From above mentioned results, it is understood that even if $SrTiO_3$ is nitrated in ammonia, the material which has an ability to reduce proton to hydrogen and to oxidize water to oxygen by visible ray having longer wave length than 420 nm can not be obtained.

INDUSTRIAL APPLICABILITY

As mentioned above, the present invention provides the excellent effect that the compounds of $TiO_aN_bF_c$ or $MeTiO_aN_bF_c$ to which nitride bond of Ti(IV) is introduced (wherein Me is alkali earth metal such as Sr, $c$ is 0.1 to 1, $b$ is 0.1 to 1, desirably $b \geqq 3$ and $a$ is decided in relation to $b$ and $c$.) have a photo-catalyst activity by visible light.

The invention claimed is:

1. A photo-catalyst containing a titanium (IV) compound comprising, $Ti(IV)O_aN_bF_c$ or a compound represented by $MeTi(IV)O_aN_bF_c$ prepared by doping at least one metal Me selected from the group consisting of alkali or alkaline earth metals on $Ti(IV)O_aN_bF_c$, wherein, b is 0.1 to 1, c is 0.1 to 1 and a is a value to maintain Ti(IV) and is decided in relation to b and c.

2. The photo-catalyst of claim 1 further comprising at least one promoter selected from the group consisting of Pt, Ni and Pd.

3. The photo-catalyst of claim 1, wherein $Ti(IV)O_aN_bF_c$ possesses anatase structure and $MeTi(IV)O_aN_bF_c$ possesses perovskite to anatase structure.

4. The photo-catalyst of claim 3 further comprising at least one promoter selected from the group consisting of Pt, Ni and Pd.

5. A photo-catalyst for water splitting containing a titanium (IV) compound comprising, $Ti(IV)O_aN_bF_c$ or a compound represented by $MeTi(IV)O_aN_bF_c$ prepared by doping at least one metal Me selected from the group consisting of alkali or alkaline earth metals on $Ti(IV)O_aN_bF_c$, wherein, b is 0.1 to 1, c is 0.1 to 1 and a is a value to maintain Ti(IV) and is decided in relation with b and c.

6. The photo-catalyst for water splitting of claim 5 further comprising at least one promoter selected from the group consisting of Pt, Ni, Ru and Pd.

7. The photo-catalyst for water splitting of claim 5, wherein $Ti(IV)O_aN_bF_c$ possesses anatase structure and $MeTi(IV)O_aN_bF_c$ possesses perovskite to anatase structure.

8. The photo-catalyst for water splitting of claim 7 further comprising at least one promoter selected from the group consisting of Pt, Ni and Pd.

9. A method for preparation of a photo-catalyst represented by $Ti(IV)O_aN_bF_c$, wherein b is 0.1 to 1, c is 0.1 to 1 and a is a value to maintain Ti(IV) and is decided in relation to b and c, comprising baking titanium di-ammonium fluoride halide represented by $(NH_4)_2TiF_dX_{6-d}$, wherein, d is 1–6, and which contains at least F and ammonium halide by the ratio of equimolar or by the ratio of slightly excess of ammonium halides at the maximum temperature from 200° C. to 500° C. whereby a starting material is formed, followed by nitrogenating said starting material by thermal synthesis in ammonia atmosphere containing from 0.02% to 10.00% of oxygen, air or water to ammonia by reduced mass to oxygen atom at the maximum temperature from 350° C. to 700° C. for over than 5 hours.

10. A method for preparation of a photo-catalyst represented by $SrTi(IV)O_aN_bF_c$, wherein, b is 0.1 to 1, c is 0.1 to 1 and a is a value to maintain Ti(IV) and is decided in relation to b and c, comprising baking titanium fluoride halide represented by $TiF_xX_{6-x}$ and/or $(NH_4)_2TiF_dX_{6-d}$, wherein x and d are 1–6, and which contains at least F, and at least one compound selected from the group consisting of SrO, SrOH and SrX so as to form a starting material or $SrTiF_6$, followed by nitrogenating said starting material or $SrTiF_6$ by thermal synthesis in ammonia atmosphere containing from 0.02% to 10.00% of oxygen, air or water to ammonia by reduced mass to oxygen atom at the maximum temperature from 350° C. to 700° C. for over than 5 hours.

* * * * *